United States Patent [19]

Higbie et al.

[11] Patent Number: 4,702,287

[45] Date of Patent: Oct. 27, 1987

[54] METHOD AND APPARATUS FOR CONTROLLING THE AUTOMATIC INFLATION OF TIRES FOR TESTING

[75] Inventors: Robert E. Higbie, Canton; James C. Beebe, Medina, both of Ohio

[73] Assignee: Eagle-Picher Industries, Inc., Cincinnati, Ohio

[21] Appl. No.: 899,996

[22] Filed: Aug. 22, 1986

[51] Int. Cl.$^4$ .............................................. B65B 3/04
[52] U.S. Cl. ........................................ 141/4; 141/67; 141/83; 141/95; 152/415
[58] Field of Search ........................................ 141/1-9, 141/10, 38, 67, 68, 83, 94-98, 114, 313-317, 65, 66, 382; 137/223, 227; 49/68; 152/415; 70/1; 157/1

[56] References Cited

U.S. PATENT DOCUMENTS 2,761,601  9/1956  Van Vooren .......................... 141/98
4,498,515  2/1985  Holtzhauser et al. ................. 141/98
4,529,019  7/1985  Blemns et al. ......................... 141/65

OTHER PUBLICATIONS

Akron Standard Drawing 3870, 10-25-76, Pneumatics Schematic.
Akron Standard Drawing 3871, 6-27-77, 4M-Pneumatics for D70 TUO & D7 TUO, Sheet 1 of 4.
Akron Standard Drawing 3871, 6-27-77, L/M Pneumatics for D70 TUO & D70LT TUO, Sheet 2 of 4.
Akron Standard Drawing 3871, 3-18-82, List of Material-Pneumatics D70 and D70LT, Sheet 3 of 4.
Akron Standard Drawing 3871, 3-18-82, List of Material-Pneumatics D70 and D70LT, Sheet 4 of 4.

*Primary Examiner*—Houston S. Bell, Jr.
*Attorney, Agent, or Firm*—Wood, Herron & Evans

[57] ABSTRACT

Apparatus for inflating tires to a test pressure. The apparatus includes a shop supply of air and a regulated supply of air. A valve system is used to connect the tire to the shop supply to seat the bead on the test rim; to exhaust the air from the tire to bring the pressure in the tire to approximately the test pressure; and to the regulated supply to bring the air in the tire to the preselected test level. The difference between the actual test pressure and the desired test pressure is measured and that difference is used to control the pressure regulator so as to correct the test pressure in the next succeeding tire.

5 Claims, 1 Drawing Figure

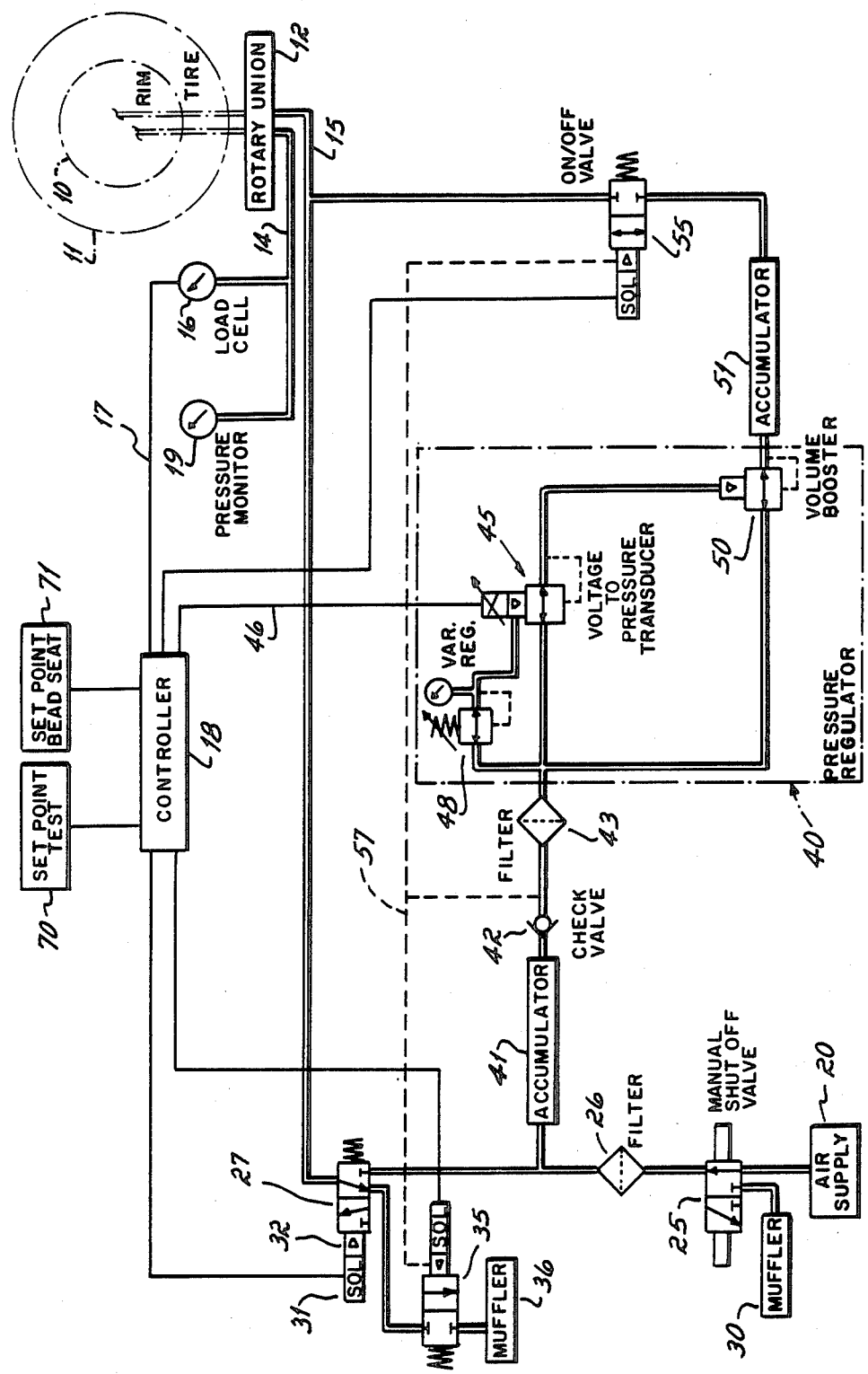

METHOD AND APPARATUS FOR CONTROLLING THE AUTOMATIC INFLATION OF TIRES FOR TESTING

BACKGROUND OF THE INVENTION

This invention relates to apparatus for inflating tires, and more particularly, to apparatus for inflating tires quickly, controllably and accurately prior to testing the tires on a tire testing machine.

Prior to testing tires in a uniformity machine or the like, the tires must be raised to a preselected pressure. It is desirable that each tire of a kind be tested at the same pressure as every other tire being tested. Bringing the tire to the desired pressure must be done as quickly as possible.

Apparatus currently in use includes a shop supply of air and a regulated supply of air with conduit connecting those supplies to the tire. A valve is provided to connect the shop supply to the tire to raise the pressure in the tire to the level, well above the test pressure, required to seat the tire bead on the test rim. The valve is then shifted to the exhaust position to exhaust the air from the tire down to that which is close to the regulated pressure. The valve then shifts to the pressure regulator which may either exhaust or introduce air to the tire in order to bring it to the test pressure. The known apparatus is imprecise and is not fully automatic, requiring manual adjustment of pressure set points with visual observation of gauges and the like. The pressure regulator has been an analog device that is manually set. More specifically, with a manual pressure regulator, the operator manually adjusts a spring force operating on a diaphragm.

An objective of the present invention has been to provide apparatus to inflate the tire quickly and precisely to the desired pressure.

Another objective of the invention has been to provide such inflation apparatus wherein all operations are performed automatically with automatic compensation in succeeding tires for errors in the test pressure in the preceding tires.

Another objective of the invention has been to provide apparatus which permits the inflation pressures to be controlled digitally rather than being adjusted using analog regulators.

The objectives of the invention are attained by providing an automatic controller connected to the valve system which shifts among "shop pressure," "exhaust" and "regulated pressure." The controller has provision for digitally setting the bead seat and test pressures to desired levels. A sensor monitors the level of pressure in each tire. A valve shifts the connections to the tire among the shop pressure, the exhaust and the regulated pressure to seat the tire beads on the test rim first, the exhaust from that high bead seat pressure and then to regulate to the test pressure.

When the operator starts the test, the shop supply is introduced to the tire which rapidly inflates the tire to the bead seat pressure. Prior to reaching the bead seat pressure, the controller energizes the appropriate solenoid to shift the valve system to exhaust, anticipating the time delay occasioned by the solenoid operation of the valve. Thus, after energizing the solenoid, the pressure continues to be introduced into the tire until the bead seat level is attained at about which time the valve system completes its shift to exhaust. The presure is then exhausted until it is close to the test pressure level. At that time the controller shifts to pressure regulated air, again anticipating a delay in the solenoid operation time. When the shift is completed, it is preferred that the level of air in the tire be below the preset test level. Air through the pressure regulator brings the pressure up to about the level for the test.

That final pressure is compared by the controller to the desired test pressure. The difference between the two pressures is stored in the controller and this difference is added to an accumulative error signal so that the voltage output to the electrical pressure controller or pressure regulator is corrected to provide more accurate inflation of each successive tire. Usually by the time of inflation of the third tire in the sequence, the desired test pressure is achieved and remains constant in successive tires.

The advantages of the invention include: the digitally settable bead seat and test pressures; the anticipation of solenoid reaction time; and the closed loop control of pressure which specifically allows a less accurate voltage-to-pressure transducer and which does not require adjusting during each tire's cycle.

The several objectives and features of the present invention will become more readily apparent from the following detailed description taken in conjunction with the accompanying drawing which is a combined air and electrical circuit diaphragm of the system of the present invention.

As shown in the drawing, a test rim 10 to which a tire 11 is mounted is connected through a rotary union 12 to two air conduits 14 and 15. Conduit 14 connects the tire to a presure transducer 16 which is connected by a line 17 to a controller 18. The controller 18 might be a programmer controller, discrete logic or a computer. Conduit 14 also is connected to a pressure gauge 19 by which the pressure in the tire can be visually monitored.

The conduit 15 is connected to the customer air supply or shop supply 20. The connection to the shop supply is made through a manual three-way valve 25, a filter 26 and a solenoid-operated three-way valve 27. The manual valve 25 has a muffler 30. The valve 27 has a solenoid 31 which is connected to a pilot 32 which actually controls the position of the valve. The valve 27, being shown in the non-energized position, connects the tire through a solenoid-operated poppet valve 35 to an exhaust muffler 36. The solenoids for the valves 27 and 35 are connected to the controller for operation, as will be described.

The shop air is also connected to the conduit 15 via a pressure regulator 40. The connection is through an accumulator 41 which is about 4' long and 24" in diameter, a check valve 42 and a filter 43. The pressure regulator 40 includes a voltage-to-pressure transducer 45 which delivers a pressure proportional to the voltage applied to the transducer through the electrical line 46 connected to the controller 18. A variable regulator 48 supplies pressure to the pilot of the voltage-to-pressure transducer. The voltage-to-pressure transducer is connected to a volume booster 50. The volume booster which may be set to 1:2, 1:3, 1:4, etc. booster ratios to deliver to the tire the desired air pressure as determined by the voltage-to-pressure transducer. A small accumulator 51 may optionally be inserted between the volume booster and the tire rim. The accumulator is a pipe about 8" long and 2" in diameter (as compared to the 1" diameter pipe going into the tire rim). It may tend to eliminate oscillation at the volume booster. The volume booster is connected to the tire rim by means of a valve 55 which is simply an on/off valve determining whether the pressure regulator is connected to the tire rim.

The pilots to valves 35 and 55 could be at zero pressure absent an external supply. Therefore, an external pressure supply is provided via the dotted line 57.

The controller has devices 70 to set the test pressure and 71 to set the bead seat pressure. In operation of the invention, the operator sets the test pressure and the bead seat pressure by operation of the devices 70 and 71. When the tire is placed on the rim, the inflation is started. First, the valve 27 is energized to shift the shop supply directly to the tire. The tire begins to inflate toward the bead seat pressure. That pressure is monitored by the pressure transducer 16 which information is delivered to the controller 18. At a pressure level below the bead seat pressure, the controller shifts the valve system 27, 35 to exhaust. The tire exhausts through the valve 27 which is de-energized and through the valve 35 through the muffler 36. Meanwhile, during the operation of the solenoid associated with the valve 27, air continues to flow into the tire until the solenoid completes the shifting of that valve. In that interval of delay, the air to the tire is brought up to the bead seat level in the range of 45 to 65 psi or approximately 50 psi.

As the air to the tire is exhausted through the valve 35, its level is continuously monitored by the pressure transducer 16. As that level approaches the desired test level, the controller closes the valve 35 and opens the valve 55 to the pressure regulator. For example, if the tire is to be tested at 35 psi, it may be desired to get down to 34 psi before the air from the pressure regulator is delivered to the tire. In that event, it may be necessary to initiate closing the exhaust valve 35 at 40 psi because 6 psi will be lost in the time required to close the valve.

After the exhaust valve is closed and the test valve 55 is opened, air is delivered to the tire until the test pressure is attained as determined by the voltage applied to the voltage-to-pressure transducer 45. As stated, that device is imprecise. With respect to the first tire in the sequence being tested, that pressure may vary from the true desired test pressure. The pressure transducer 16 senses the tire pressure. That sensed pressure is compared to the desired test set point. The difference is stored and added to the accumulative error signal. The voltage output to the voltage-to-pressure transducer is then corrected to provide a more accurate inflation to the next successive tire. The next successive tire, when taken through the sequence of operations described above, should produce a smaller difference between the sensed pressure and the set point test pressure. By the time of the testing of the third or fourth tire, the sensed pressure and the set point test pressure should be substantially the same.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof.

What is claimed is:

1. Apparatus for inflating, to a desired test pressure, a series of tires to be tested comprising:
    a supply of shop air under pressure,
    conduit connecting said supply, unregulated, to a tire to inflate said tire to a bead seat pressure,
    conduit connecting said tire to exhaust,
    a pressure sensor for monitoring the pressure in the tire,
    a pressure regulator,
    conduit connecting said supply through said pressure regulator to said tire to provide a regulated test pressure,
    valve means for selectively connecting said tire to said shop supply conduit, to said exhaust conduit and to said regulated supply conduit,
    and a controller connected to said valve means to connected said tire first to an unregulated supply, second to exhaust to exhaust the pressure in the tire below the test pressure, and third, to a regulated supply to raise the pressure to a test pressure, said controller being connected to said pressure sensor and said pressure regulator to compare the tire test pressure to a desired pressure, to note the error, and to correct the pressure regulator to vary the test pressure on the next tire to be tested.

2. Apparatus as in claim 1 wherein said controller signals a shift of said valve means from shop supply conduit to exhaust conduit before the bead seat pressure is attained whereby to permit time delay in the system to complete the inflation as said valve makes its shift.

3. Apparatus as in claim 1 wherein said controller signals a shift of said valve means from said exhaust conduit to said pressure regulator conduit after said tire is exhausted below test pressure whereby to permit air from said pressure regulator to be introduced into said tire to bring said tire to the desired test pressure.

4. The method of inflating a series of tires to a set test pressure comprising the steps of:
    first inflating a tire to a bead seat pressure,
    partially exhausting the pressure to approximately the test pressure,
    inflating the tire to the test pressure as determined by a voltage-to-pressure transducer,
    determining the difference between the actual test pressure and the set test pressure,
    and correcting the voltage to the voltage-to-pressure transducer by the amount of said difference whereby the next succeeding tire will be inflated to an actual pressure closer to said set pressure.

5. The method as in claim 4 in which said tire is exhausted to a pressure level below test pressure prior to inflating to test pressure.

* * * * *